UNITED STATES PATENT OFFICE.

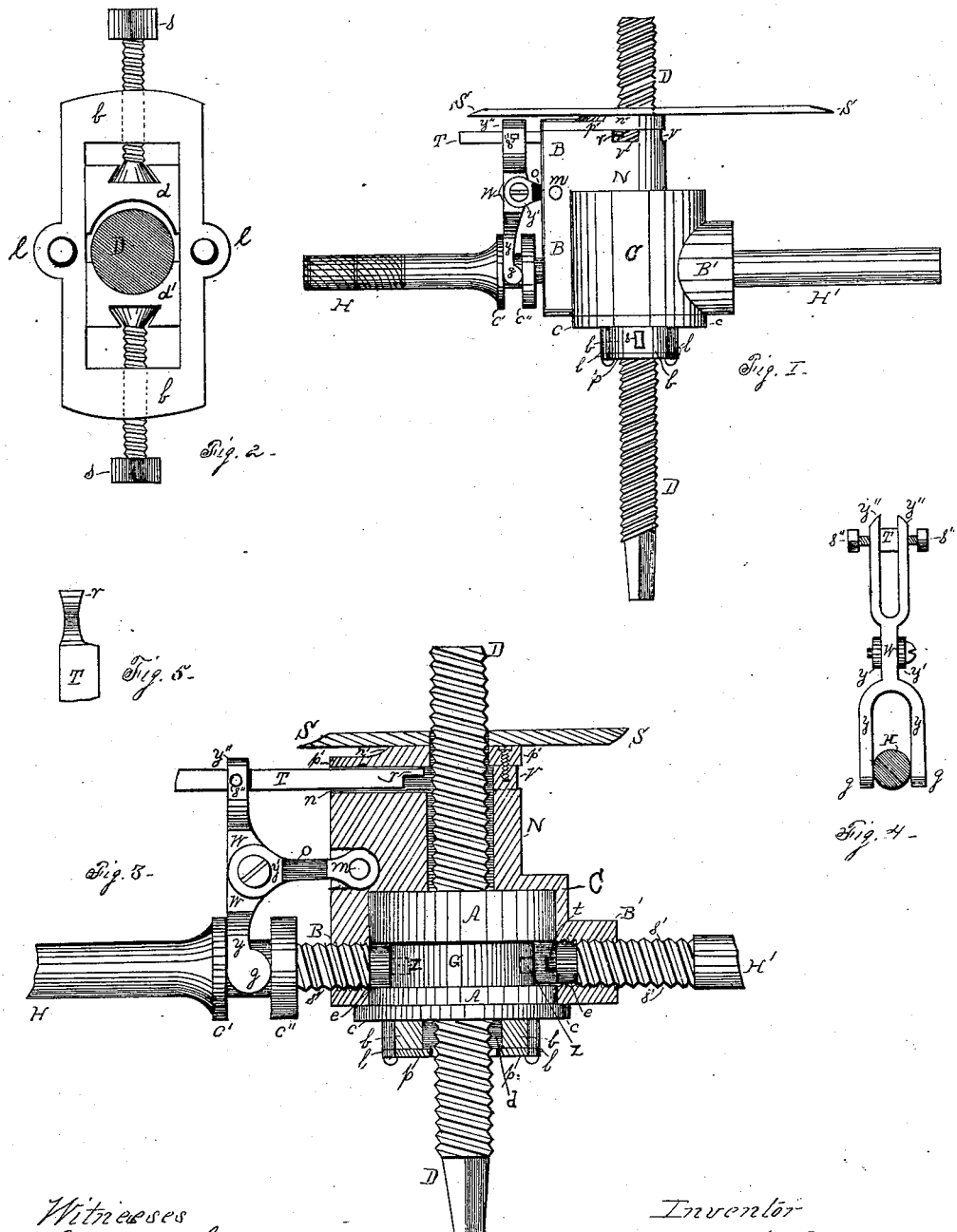

CHARLES V. ROTE, OF LANCASTER, PENNSYLVANIA.

STAY-BOLT CUTTER.

SPECIFICATION forming part of Letters Patent No. 254,163, dated February 28, 1882.

Application filed November 15, 1881. (No model.)

*To all whom it may concern:*

Be it known that I, CHARLES V. ROTE, a citizen of the United States, residing at Lancaster, in the county of Lancaster and State of Pennsylvania, have invented certain Improvements in Stay-Bolt Cutters, of which the following is a specification.

My invention relates to machines for cutting off stay-bolts when in the sheet; and the object of my improvement is to cut off the bolt without injury to the thread thereof, so that it is left in condition to be again screwed into a bolt-hole without any recutting. I attain this object by the mechanism illustrated in the accompanying drawings, in which—

Figure 1 is a side view of the cutter; Fig. 2, a vertical view of the die and die-box, with the covering-plate removed, for holding the instrument steadily in place while cutting a bolt; Fig. 3, a section through the cylinder and throat of the device, as seen in Fig. 1; Fig. 4, a view of the walking-beam, by means of which the cutting-tool is applied to the bolt; and Fig. 5 is a view of the blade of the tool.

The body of my cutter is composed of a cylinder, C, having the bosses B and B', and a neck, N, in front. Fitting into the cylinder is a sleeve, A, with a groove, G, for receiving the cylindrical ends $e$ of the handles H and H', and with a collar, $c$, resting against the end of the cylinder. Through the center of the sleeve and neck of the cylinder there is a cylindrical opening for receiving the bolt D to be cut. Attached to the outer end of the sleeve is a box, $b$, the inner side of which is open and fits over the opening for receiving the bolt, the outer or rear side being covered with a plate, $p$, with an opening similar and opposite to that in the sleeve. The plate is secured to the box and the box to the sleeve by means of screws working through lugs $l$ in said plate and box. In this box are dies $d$ and $d'$, with inner concave surfaces, which have female screws cut therein, corresponding with the thread of the screw of the bolt to be cut, which are moved toward and from each other by means of thumb-screws $s$, working through the ends of the box. There are circular openings through the bosses B and B' of the cylinder C, opposite to the groove G in the sleeve, with female screws cut therein for the reception of the screw ends S' of the handles H and H'. These handles have plain cylindrical projections $e$ beyond the screws, with a teat, $t$, as shown in Fig. 3, which projections exactly fit the groove G in the sleeve, the teats fitting into sockets $z$ in the bottom of said groove. These teats may be used upon the ends of both handles, as shown; but generally one on the end of the handle H will be found sufficient, preventing the movement of the body of the cutter about the sleeve when resting in the sockets $z$. The object in thus rendering the sleeve A immovable within the cylinder C is to facilitate the passage of the bolt through the cutter in getting said cutter to the point at which the bolt is to be cut, the opening through the sleeve fitting the bolt somewhat closely, for the purpose hereinafter stated.

The handle H has two collars, $c'$ and $c''$, between which work the bossed ends $g$ of a yoke, $y$, of the walking-beam W, which ends embrace the stem of the said handle, the walking-beam itself being centered in a yoke, $y'$, of the post O, the lower end of which post is pivoted at $m$ in a recess in the boss B. The other or front end of the walking-beam also has a yoke, $y''$, which embraces the outer end of a tool, T. The tool is secured in the yoke by pointed set-screws $s''$, and works through the opening $n$ in the boss B into the cylindrical opening through the neck N, where the blade $r$ operates on the bolt to be cut. Above, below, and at the side opposite that entered by the tool there are openings V in the neck, which permit the escape of cuttings from the bolt. The front end of the neck is covered by a steel plate, $p'$, having a nose, $n'$, which is secured to the same by means of screws with countersunk heads.

In using my invention the dies $d$ and $d'$ are opened, the handles are screwed into the bosses until the ends set against the bottom of the groove G, as shown by the handle H in Fig. 3, and the teat $t$ fits into its corresponding socket $z$ in the same. By this movement of the handle H, operating by means of the walking-beam, the tool is freed from the cylinder which receives the bolt D, and the cylinder C is prevented from turning about the sleeve by the teat $t$. The bolt is then pushed through the cutter, being inserted through the opening in the box $b$. After the bolt has been fixed in place in the sheet S the nose $n'$ of the cutter is pushed flat against it, and the dies are closed upon the bolt by means of the thumb-screws $s$, and embrace it so firmly as to prevent any movement of the same in or through the box and the sleeve A, to which it is attached. The handle H, or both H and H′, if the latter has a teat at its inner end, is screwed outward until the teat $t$ is freed from its socket $z$, allowing the cutter to turn freely about the sleeve and the bolt which it holds. This movement of the handle H forces the blade $r$ of the tool T down upon the bolt, when the cutter is revolved by means of both handles. As each complete circle is made, H, which has its outer end milled in order to strengthen the grip, is screwed farther out, thus keeping the blade to the bolt and causing it to cut deeper and deeper. The relative length of the cylindrical projection $e$ at the end of the handles and the tool T is such that the cutting is completed before the said projection $e$ clears the groove G of the sleeve. Upon finishing the cutting, the blade is withdrawn by screwing the handle in again, and, after the main bolt is detached from that in the sheeting, the cutter is set for further work. The sides of the blade $r$ are concave, so as to allow it to be freely withdrawn from its cut in the bolt.

The opening through the sleeve A for receiving the bolt is sufficiently tight to serve as a guide to direct the bolt to the opening in the nose $n'$, which latter is small enough to prevent any vibration of the cutter on the bolt at the nose, while the diameter of the opening through the neck is considerably larger than that of the bolt.

I would call attention to the facts, first, that the opening which allows the passage of the bolt through the neck N is larger than the bolt, thus avoiding any pressure upon the thread of the screw inside of the blade $r$, so that after the cutting the screw is ready to enter a bolt-hole without any further preparation; second, that at the points at which the bolt and instrument are held in place while the former is being cut there is no injury caused to any part of the thread of the bolt to be again screwed through the sheeting, as one of these is the sheeting itself, where the bolt has already been screwed in, and where the part of the same pressed upon by the nose of the cutter between the sheeting and the blade is used to form a bolt-head, and as the other is the dies with female screws, which exactly fit the thread of the bolt; third, that the arrangement of the flanged sleeve with the box and dies and the main cylinder with its handles forms its own backing for holding the nose of the instrument immovable against the sheeting while cutting the bolt; and, fourth, that the securing such immobility causes the cut made by the blade to be perfectly square and clean, leaving the bolt-thread at the cut unmarred and ready for further use without additional preparation.

What I claim as my invention, and desire to secure by Letters Patent, is—

1. In a bolt-cutter, the combination of the cylinder C, having bosses B and B′, handles H and H′, with cylindrical ends $e$, and the sleeve A, having the groove G, by which the said sleeve is held in the cylinder when the cutter is not being operated, substantially as herein set forth.

2. In a bolt-cutter, the combination of the cylinder C, having bosses B B′, handles H and H′, with cylindrical ends $e$ and teats $t$, and the sleeve A, having the groove G and sockets $z$, whereby the sleeve can be prevented from revolving within the cylinder, substantially as herein specified.

3. In a bolt-cutter, the combination of the cylinder C, having bosses B and B′, handles H and H′, with cylindrical ends $e$, the sleeve A, having a groove, G, and the box $b$, provided with the dies $d$ and $d'$ and thumb-screws $s$, whereby part of the cutter remains stationary, holding the whole in place while the other revolves in cutting a bolt, substantially as herein set forth.

4. The combination, in a bolt-cutter, of the sleeve A, having the box $b$, with dies $d$ and $d'$ and screws $s$, the cylinder C, having a neck, N, with an enlarged cylindrical opening, and the plate $p'$, with an opening the periphery of which fits closely to the bolt, as and for the purpose specified.

5. In a bolt-cutter, the combination of the handle H, working back and forth in the boss B, the walking-beam W, operating in the yoke $y'$ of the post O, and the tool T, all constructed and operated substantially in the manner described.

6. The combination of the sleeve A, provided with the groove G and sockets $z$, and having attached thereto the box $b$, with the dies $d$ and $d'$ and screws $s$, the cylinder C, with the bosses B and B′ and neck N, handles H and H′, with projections and teats, walking-beam W, and tool T, with blade $r$, all substantially as and for the purpose specified.

CHARLES V. ROTE.

Witnesses:
W. B. WILEY,
G. A. LANE.